United States Patent [19]

May et al.

[11] Patent Number: 5,809,251

[45] Date of Patent: Sep. 15, 1998

[54] REMOTE INSTALLATION OF SOFTWARE BY A MANAGEMENT INFORMATION SYSTEM INTO A REMOTE COMPUTER

[75] Inventors: Gregory J. May, Corvallis, Oreg.; Colin I'Anson, Bristol, England

[73] Assignee: Hewlett-Packard Company, Palo Alto, Calif.

[21] Appl. No.: 728,004

[22] Filed: Oct. 9, 1996

[51] Int. Cl.$^6$ .................................................... G06F 13/00
[52] U.S. Cl. ............................. 395/200.53; 395/200.69; 395/712
[58] Field of Search ................................... 395/712, 619, 395/651, 200.01, 200.09, 200.12, 200.14, 200.02, 200.3, 200.47, 200.57, 200.67, 200.48, 200.68, 200.69, 200.55, 200.53, 200.56; 707/203

[56] References Cited

U.S. PATENT DOCUMENTS

| | | | |
|---|---|---|---|
| 4,636,950 | 1/1987 | Caswell et al. | 395/228 |
| 4,788,637 | 11/1988 | Tamaru | 395/200.1 |
| 5,008,814 | 4/1991 | Mathur | 395/200.09 |
| 5,043,721 | 8/1991 | May | 340/825.44 |
| 5,155,847 | 10/1992 | Kirouac et al. | 395/200.1 |
| 5,293,484 | 3/1994 | Dabbs, III et al. | 395/201 |
| 5,337,044 | 8/1994 | Folger et al. | 340/825.44 |
| 5,367,452 | 11/1994 | Gallery et al. | 395/228 |
| 5,387,904 | 2/1995 | Takada | 340/825.44 |
| 5,406,643 | 4/1995 | Burke et al. | 395/200.12 |
| 5,444,438 | 8/1995 | Goldberg | 340/825.44 |
| 5,577,244 | 11/1996 | Killebrew et al. | 395/703 |
| 5,581,703 | 12/1996 | Baugher et al. | 395/200.55 |

OTHER PUBLICATIONS

"IBM TME 10 NetFinity Server Up and Running", Jun. 1996, IBM, US XP002055592, Publication No. SH19–4302–00, p. 120, line 35–p. 124, line 4; figure 68.

"Electronic Phone Book For Video Conferencing", IBM Technical Disclosure Bulletin, vol. 36, No. 6A, 1 Jun. 1993, pp. 57–61, XP000370759, the whole document.

Database IAC Newsletter Collection, Information Access Company, XP002055593, & "Epilogue Technology, Xircom finalize mobile MIB proposal", The Osinetter Newsletter, vol. 10 No. 6, Jun. 1995, the whole document.

"Inter–Process Communications Library", IBM Technical Disclosure Bulletin, vol. 36, No. 1, 1 Jan. 1993, pp. 59–60, XP00033372.

*Primary Examiner*—Parshotam S. Lall
*Assistant Examiner*—Viet Vu

[57] ABSTRACT

Remote installation of an update of software is forwarded by a management information system into a remote computer. When a primary communication path between the management information system and the remote computer is unavailable and an alternate communication path is available, a connection is established between the management information system and the remote computer using the alternate communication path. The management information system requests from the remote computer the current version information about the software within the remote computer. When the management information system determines the current version of the software within the remote computer needs to be updated, the management information system determines whether the alternate communication path is adequate for downloading the update of the software. When the management information system determines that the alternate communication path is adequate for downloading the update of the software, the update of the software is downloaded from the management information system to the remote computer.

22 Claims, 18 Drawing Sheets

FIGURE 5

| DEVICE # | PATH TYPE | ADDRESS | COST | THRPUT | RSP TIME |
|---|---|---|---|---|---|
| PC 16 | LAN | XXXX | TIME DEP | FAST | XXXX |
| PC 16 | MODEM | XXXX | MODEM | 28KBS | XXXX |
| PC 16 | PAGER | XXXX | PAGER | 9.6KBS | XXXX |
| PC 17 | MODEM | XXXX | MODEM | 14KBS | XXXX |
| PC 17 | PAGER | XXXX | PAGER | 9.6KBS | XXXX |
| PC 18 | LAN | XXXX | TIME DEP | FAST | XXXX |
| PC 18 | MODEM | XXXX | MODEM | 14KBS | XXXX |
| PC 18 | PAGER | XXXX | PAGER | 9.6KBS | XXXX |
| PC 19 | LAN | XXXX | TIME DEP | FAST | XXXX |
| PC 20 | LAN | XXXX | TIME DEP | FAST | XXXX |
| PC 20 | MODEM | XXXX | MODEM | 28KBS | XXXX |
| PC 20 | PAGER | XXXX | PAGER | 9.6KBS | XXXX |
| PC 21 | LAN | XXXX | TIME DEP | FAST | XXXX |

FIGURE 6

| PATH TYPE | ADDRESS | COST | THRPUT | RSP TIME |
|---|---|---|---|---|
| LAN | XXXX | TIME DEP | FAST | XXXX |
| MODEM | XXXX | MODEM | 14KBS | XXXX |
| PAGER | XXXX | PAGER | 9.6KBS | XXXX |

REMOTE INSTALLATION OF SOFTWARE BY A MANAGEMENT INFORMATION SYSTEM INTO A REMOTE COMPUTER

BACKGROUND

The present invention concerns management of computing devices and pertains particularly to the installation of software on a remote computing device.

Management information systems (MIS) are used to manage computing devices by monitoring and checking inventory, taking the current status of machine configurations (such as current memory configurations, hard drive capacity, RAM, CPU and other upgrades) as well as to monitor usage patterns. An MIS console 11 for an MIS system generally utilizes a desktop management interface (DMI) located within each personal computer (PC) or server. DMI is a standard interface which handles communication between management applications and all the manageable elements on or attached to a personal computer or server. DMI provides the communication between any management application and the manageable elements on a system. Within the DMI, the standard way of describing elements is provided by the management information format (MIF). The MIF is a prescribed grammar and syntax to an element's manageable attributes. MIF files are standard at the group level and at the element level, so common aspects of many different elements can be provided by using standard MIF files and MIF groups. Standard MIF files and groups exist for many common elements.

Within the DMI, a service layer is a program, running on the local machine or personal computer, that collects information from elements, manages that information in the MIF database, and passes the information to management applications as requested. The service layer controls communication between itself and management applications by means of a management interface (MI) and between itself and manageable elements by means of a component interface (CI). For example, a service layer interface for Windows 3.1X operating system is available from Intel Corporation, having a business address of 2200 Mission College Boulevard, Santa Clara, Calif. 95050.

Within the DMI, management applications are remote or local programs used for changing, interrogating, controlling, tracking and listing the elements of a system. A management application can be a local diagnostics or installation program, or a remote agent which redirects information from the DMI service layer over a network.

Manageable elements are hardware, software or peripherals that occupy or are attached to a personal computer or network server. For instance manageable elements include hard disks, word processors, CD-ROMs, printers, motherboards, operating systems, spreadsheets, graphics cards, sound cards, or modems. Each element provides information to the MIF database by means of an MIF file which contains the pertinent management information for that element. The information in the MIF file is compiled into the MIF database when the element is installed.

MIS managers can query individual machines to access DMIs and MIF databases on individual machines in order to obtain current information stored therein. Based on this information, MIS managers can schedule upgrades for outdated hardware and software configurations.

While an MIS has been used effectively to manage PCs and servers interconnected by a local area network (LAN), there has been no similar effective strategy to manage devices which are not connected to a LAN. For example, there is no effective strategy to manage portable computers which are seldom or never permanently connected to a LAN. Yet with the proliferation of the usage of portable computers, it is desirable to include such devices within an MIS.

SUMMARY OF THE INVENTION

In accordance with the preferred embodiment of the present invention, remote installation of an update of software is forwarded by a management information system into a remote computer. When a primary communication path between the management information system and the remote computer is unavailable and an alternate communication path is available, a connection is established between the management information system and the remote computer using the alternate communication path. The management information system requests from the remote computer the current version information about the software within the remote computer. When the management information system determines the current version of the software within the remote computer needs to be updated, the management information system determines whether the alternate communication path is adequate for downloading the update of the software. When the management information system determines that the alternate communication path is adequate for downloading the update of the software, the update of the software is downloaded from the management information system to the remote computer.

In the preferred embodiment, when the management information system determines that the alternate communication path is not adequate for downloading the update of the software, the download of the update of the software from the management information system to the remote computer is queued for performance when the computer is connected to the primary communication path or another alternative path.

For example, the primary communication path is through a local area network or alternately through a public telephone system or some other connection media, e.g., the internet. Likewise, for example, the alternate communication path is through a two-way paging network system, through a public telephone system, or through some other connection media.

BRIEF DESCRIPTION OF THE DRAWINGS

FIG. 5 shows a table within an MIS console which is used to select a communication path to managed elements in accordance with a preferred embodiment of the present invention.

FIG. 6 shows a table within a personal computer which is used to select a communication path to an MIS console in accordance with a preferred embodiment of the present invention.

DESCRIPTION OF THE PREFERRED EMBODIMENT

Figure 1:
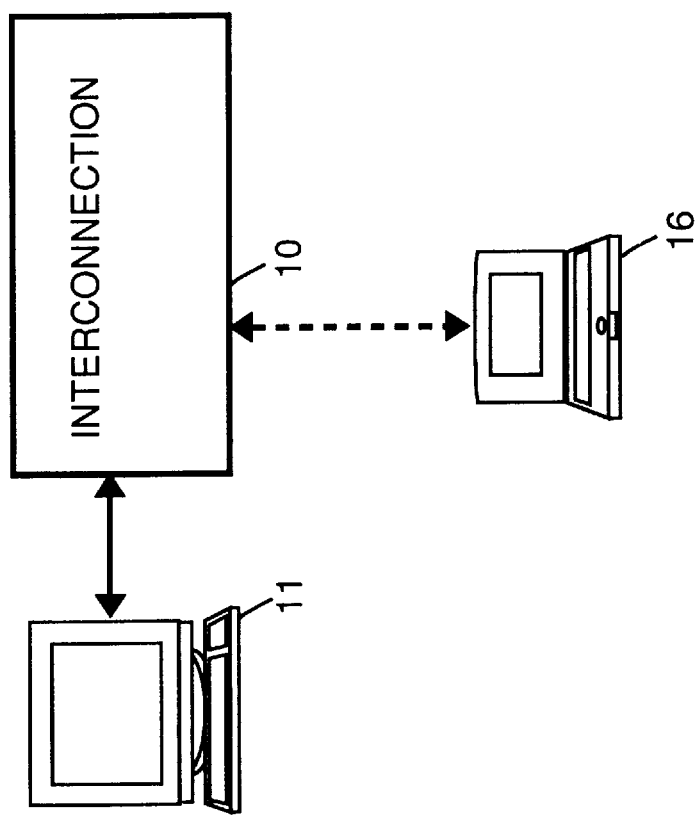
FIG. 1 shows the connected relationship between a management information system (MIS) console and a portable computer in accordance with a preferred embodiment of the present invention.

FIG. 1 shows a management information system (MIS) console 11 connected through an interconnection 10 to a portable computer 16. The dotted line between interconnection 10 and portable computer 16 indicates that portable computer 16 may be only intermittently available through interconnection 10. Interconnection 10 may include any combination of communications technology. For example, interconnection may include one, or a combination of, a local area network, a wide area network, the internet, the world wide web, a public telephone system, a private telephone system, a modem, a paging network system, radio frequency transmission, a cellular phone system, and so on.

Figure 2:
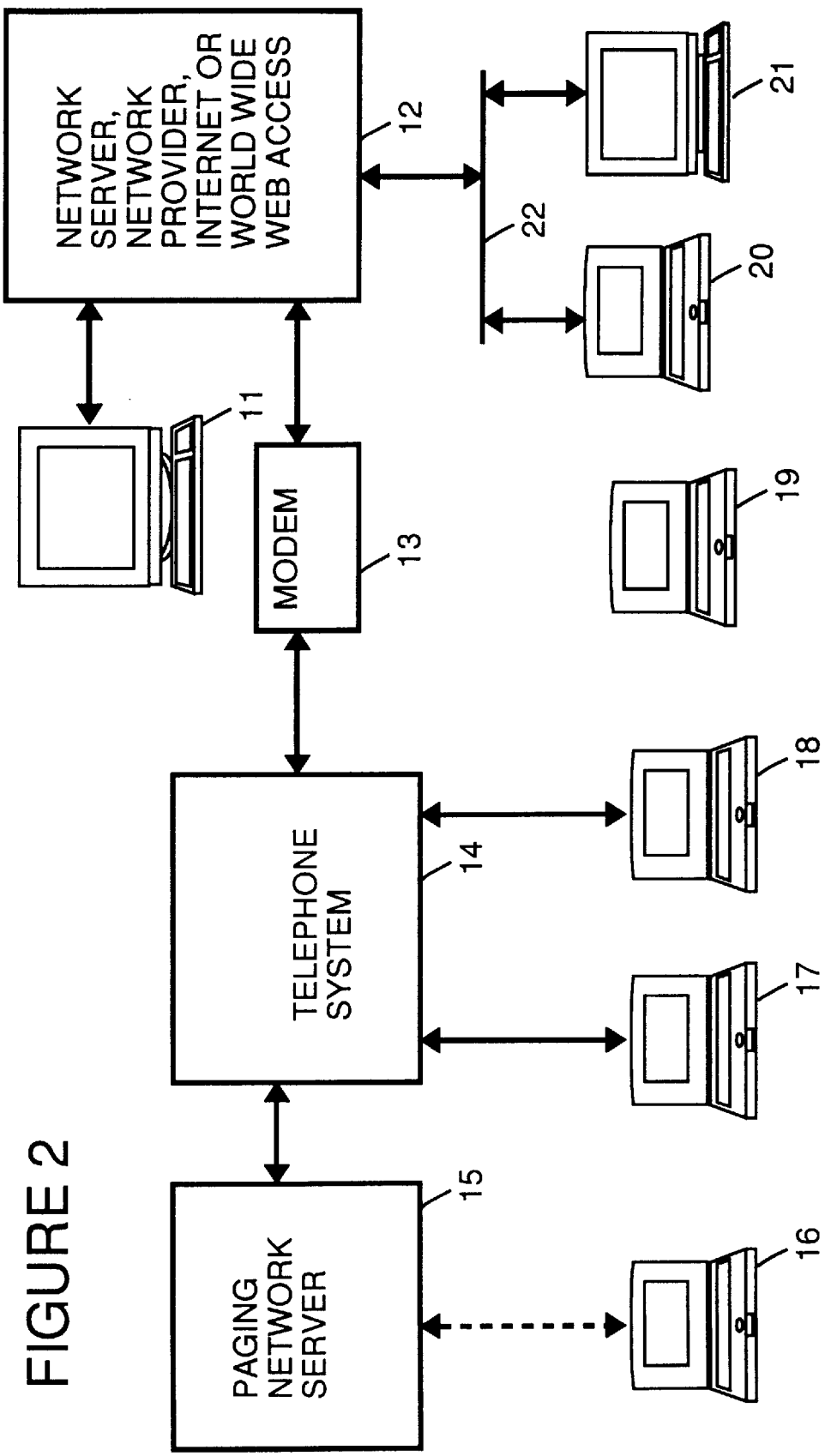
FIG. 2 shows a management information system (MIS) which includes portable computers in accordance with a preferred embodiment of the present invention.

For example, FIG. 2 shows a management information systems (MIS) which includes MIS console 11 and a network access 12. Network access 12 is, for example, a network server, a network provider, an internet access or a world wide web access. Network access 12 is connected through a local area network (LAN) 22 to a portable computer 20 and a computer 21. Based on the discretion of the user of portable computer 20, portable computer 20 may or may not be permanently attached to LAN 22. In addition to portable computer 20 and computer 21, other personal computers, servers and portable computers may be connected to LAN 22.

Network access 12 is connected to a telephone system 14 through a modem 13. A portable computer 17 and a portable computer 18 utilize telephone system 14 to connect network access 12 and, when connected are available to MIS console 11.

A paging network server 15 is connected to telephone system 14. Through two-way paging network server 15, MIS console 11 is able to contact portable computer 16. Use of two-way paging network server 15 has the advantage of making portable computer 16 always available to MIS console 11.

A portable computer 19 is not connected to any network and is thus currently unavailable to MIS console 11. Once portable computer 19 is connected to LAN network 22, telephone system 14 and/or paging network server 15, MIS console 11 will be able to access portable computer 19.

Enhanced Desktop Management Interface

Figure 3:
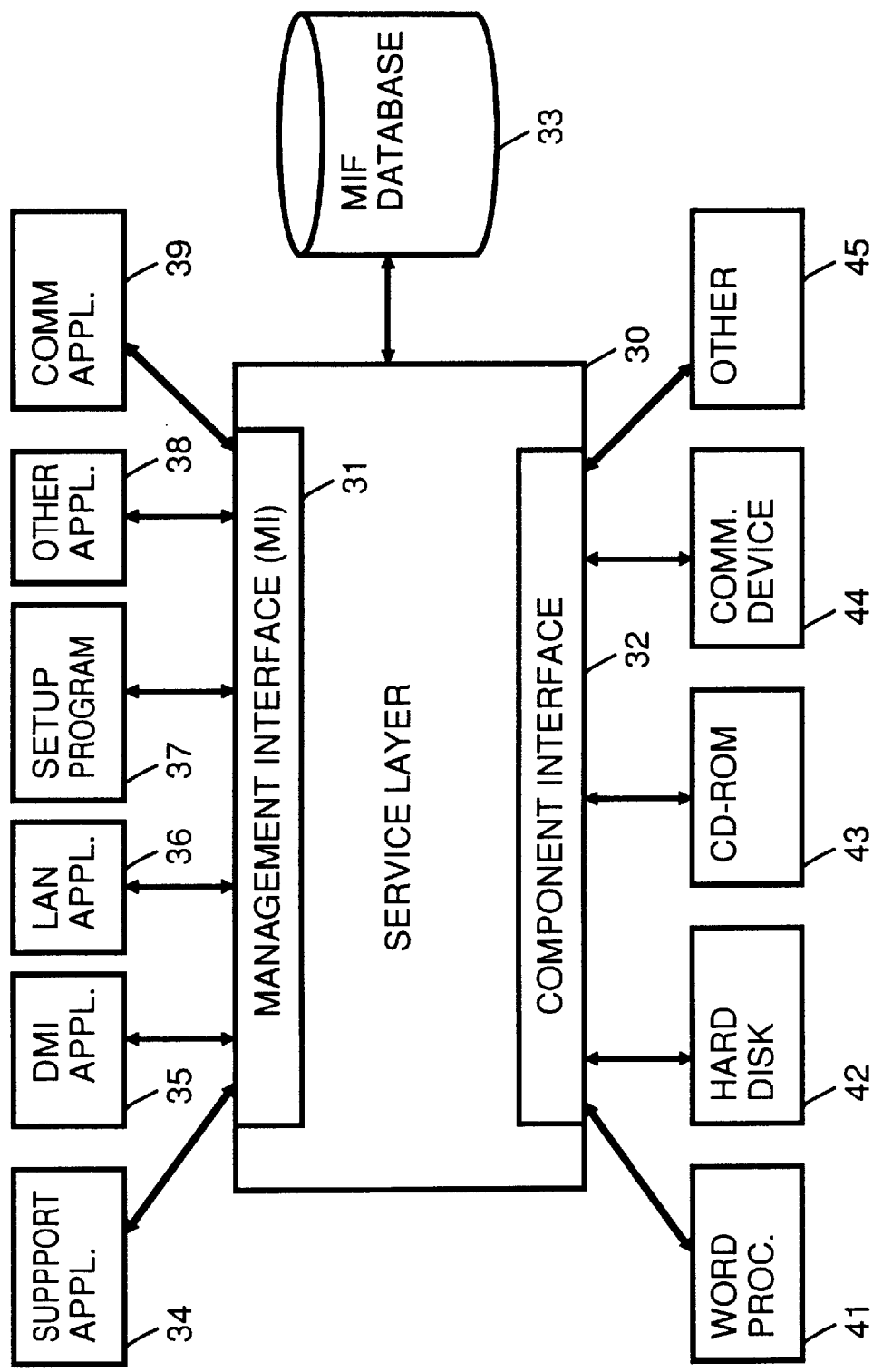
FIG. 3 shows an enhanced desktop management interface (DMI) which has been modified for use in a portable computer in accordance with a preferred embodiment of the present invention.

FIG. 3 illustrates an enhanced desktop management interface (DMI) located within each of personal computers 16 through 20. Within the DMI, a service layer 30 collects information from elements, manages that information in an MIF database 33, and passes the information to management applications as requested.

Service layer 30 controls communication between itself and management applications by means of a management interface (MI) 31 and between itself and manageable elements by means of a component interface (CI) 32.

Management applications are remote or local programs for changing, interrogating, controlling, tracking and listing the elements of a system. A management application can be a local diagnostics or installation program, or a remote agent which redirects information from DMI service layer 30 over a network. For example, in FIG. 3, management interface 31 is shown to interface to a support management application 34, a DMI application 35, a LAN management application 36 and a setup program 37. Management interface 31 also interfaces to other management applications, as represented by an other management application 38.

Manageable elements are hardware, software or peripherals that occupy or are attached to a portable computer. For example, in FIG. 3, component interface 32 is shown interfacing with a word processor 41, a hard disk 42 and a CD-ROM 43. Component interface 32 also interfaces to other manageable elements, as represented by other element 45.

Within management information format (MIF) database 33 there is stored MIF files for the manageable elements and the management applications.

A communication management application 39, connected to management interface 31, and a communication device 44, connected to component interface 32 are added to the DMI in order to provide an alternate communication path for MIS. Communication device 44 is, for example, a two-way pager. Alternately, communication device 44 is a modem, a radio frequency transceiver or some other connection to a communication medium which allows the personal computer to establish contact with an MIS console 11. In some embodiments of the present invention, communication can be one-way, for example, implemented using a one-way pager. Communication through communication device 44 is controlled by communication management application 39.

The existence of an alternate communication path for MIS increases flexibility for an MIS manager. In effect, the existence of the alternate communication path for MIS allows an MIS manager to manage portable computers and other devices which are not directly connected to a LAN. The alternate communication path can be used, for example, by the MIS manager to direct a managed portable computer of the need to connect to a primary communication path in order to receive an update.

Figure 4:
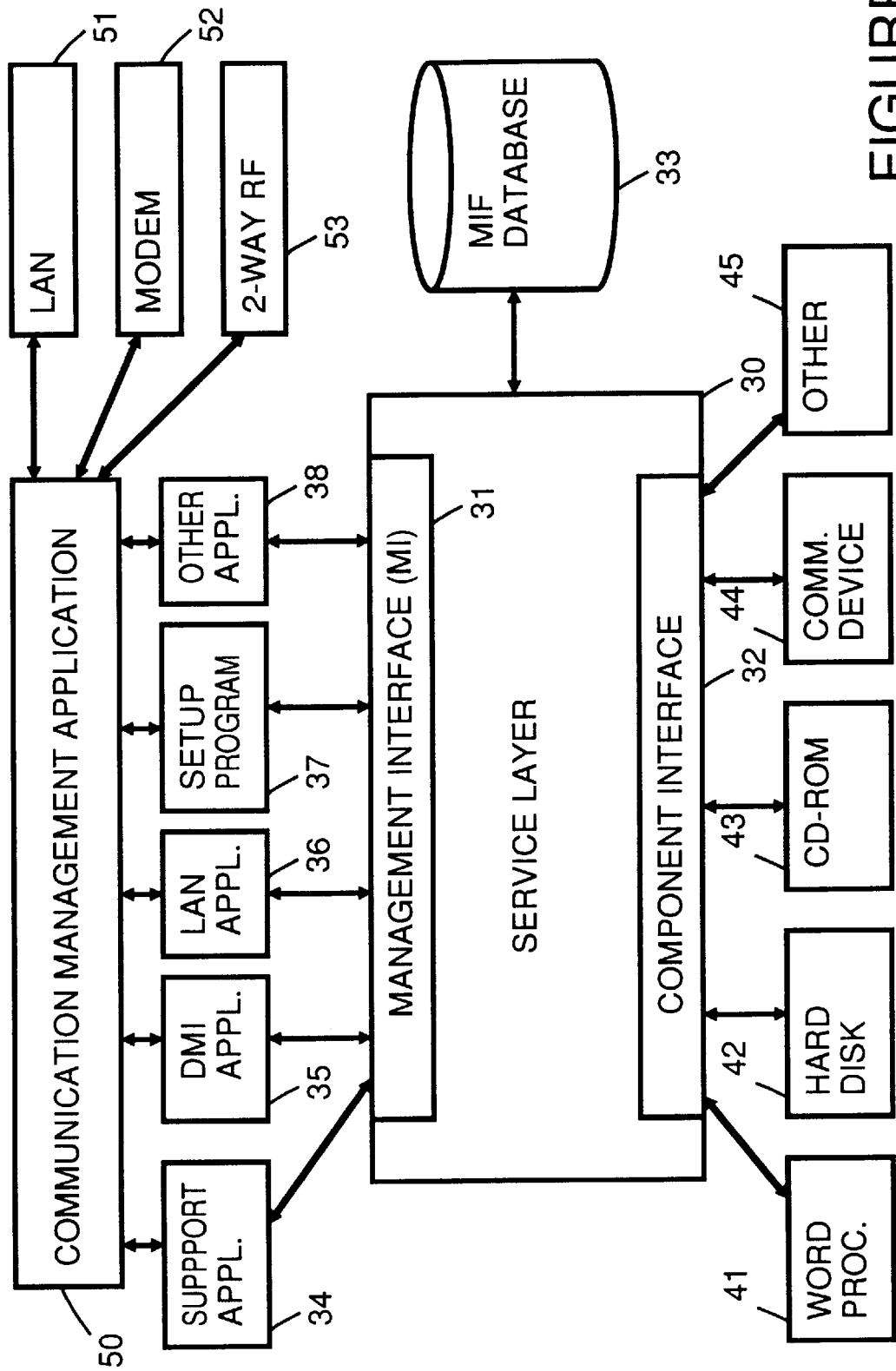
FIG. 4 shows an enhanced desktop management interface (DMI) which has been modified for use in a portable computer in accordance with an alternate preferred embodiment of the present invention.

FIG. 4 illustrates an alternate structure for the enhanced desktop management interface (DMI) shown in FIG. 3. In FIG. 4, a communication management application 50 is connected to each of the management applications. For example, as shown in FIG. 4, communication management application 50 is connected to support management application 34, DMI application 35, LAN management application 36 and setup program 37. Communication management application 50 also interfaces to other management applications, as represented by other management application 38.

Communication management application 50 selects a communication path to MIS console 11. For example, communication management application 50 uses an LAN interface 51, a modem interface 52 or a two-way pager interface 53 to establish a communication path to MIS console 11. Alternately, communication device 44 is a modem, or some other connection to a communication medium which allows the personal computer to establish contact with an MIS console 11.

Within communication management application 50, the available communication paths are priority ranked. For example, the communication management application 50 will communicate with MIS console 11 over LAN 22 when the personal computer is connected to LAN 22. If communication management application 50 is not connected to an LAN with access to MIS console 11, communication management application 50 will establish contact with MIS console 11 over public telephone system 14 using modem interface 52. If communication management application 50 is not connected to an LAN with access to MIS console 11 and access over public telephone system 14 using modem interface 52 is not available, communication management application 50 will establish contact with MIS console 11 using two-way pager interface 53 to make contact with paging network server 15.

Because the rate of data transfer between MIS console 11 and the personal computer depends upon which communication path is used, there are some transactions which are restricted, depending of the communication path. For example, when contact with MIS console 11 is established using two-way pager interface 53 to make contact through paging network server 15, major downloads of software from MIS console 11 or major uploads of database data from MIS console 11 are not performed.

FIG. 5 shows a table 60 within MIS console 11 which lists various devices managed by MIS console 11. For each managed device, in descending order of priority, the potential communication path types are listed. For each potential path type, an address, cost, throughput rate and expected response time are listed.

Specifically, as shown in FIG. 5, a column 61 of table 60 lists the device by device number. In column 61, portable computer 16, portable computer 17, portable computer 18, portable computer 19, portable computer 20 and computer 21 are listed.

In a column 62 of table 60, various communication path types are listed for each listed device. For the example shown in FIG. 5, each listed device can be contacted using one or more of the following path types: LAN, MODEM, PAGER. The path type of LAN indicates that MIS console 11 can contact the device through LAN 22 or some other LAN. The path type of MODEM indicates that MIS console 11 can contact the device through telephone system 14. The path type of PAGER indicates that MIS console 11 can contact the device through paging network server 15.

In a column 63 of table 60, the address of the device over the communication path is listed. This address is specific to the particular device.

In a column 64 of table 60, a cost code is listed which indicates for the listed device a cost for the connection. This cost code is used by MIS console 11 to determine whether, for a particular management operation, it is desirable to utilize this communication path to perform the management operation, depending upon urgency. In FIG. 5, there are three cost codes listed. For example, the TIME DEP cost code indicates that the particular cost is time dependent. In this case, there is a very low cost for performing a management operation in off hours, and a higher cost for performing the management operation in normal working hours. Thus, unless it is important to perform a particular management operation immediately, MIS console 11 can elect to perform the management operation at a later time. The MODEM cost code is the cost code assigned when telephone system 14 is used to complete the call. Generally, the MODEM cost is higher than the TIME DEP cost. The PAGER cost code is the cost code assigned when paging network server 15 is used to complete the call. Generally, the PAGER cost is higher than the MODEM cost. Other alternative communication methods also can be ranked accordingly.

In a column 65 of table 60, a throughput rate is listed which indicates for the listed device a throughput rate for the particular communication path. For communication paths though telephone system 14, the throughput rate can vary based on the throughput rate of a modem installed within the device.

In a column 66 of table 60, a response time is listed which indicates an expected response time for the device to respond when contacted through the particular communication path. Alternately, the listed response time indicates a maximum allowed response time for the device to respond when contacted through the particular communication path. When the device fails to respond, this indicates to MIS console 11 that the device is not available to be contacted through the chosen communication path. MIS console 11 can then choose to attempt connection through an alternate communication path for the device, try the same communication path at another time, or abandon the attempt to contact the device.

Likewise, the individual personal computers can similarly prioritize data communication paths for contacting MIS console 11 to initiate or respond to significant MIS events such as hardware failure warnings. Upon detection of a significant event, communications management application 50 can inform the user of the personal computer of the event or can automatically contact MIS console 11 through an available communication data path.

For example, FIG. 6 shows a table 70 within personal computer 18 which lists in descending order of priority, the potential communication path types to MIS console 11. For each potential path type, an address, cost, throughput rate and expected response time are listed.

Specifically, as shown in FIG. 6, in a column 72 of table 70, various communication path types are listed. For the example shown in FIG. 6, personal computer 18 can contact MIS console 11 through the following path types: LAN, MODEM, PAGER.

In a column 73 of table 70, the address of MIS console 11 over the communication path is listed. This address is specific to MIS console 11.

In a column 74 of table 70, a cost code is listed which indicates for the listed device a cost for the connection. This cost code is used by portable computer to determine whether, for a particular management operation, it is desirable to utilize this communication path to perform the management operation, depending upon urgency. In FIG. 6, there are three cost codes listed, as further discussed above.

In a column 75 of table 70, a throughput rate is listed which indicates for the listed device a throughput rate for the particular communication path. For communication paths though telephone system 14, the throughput rate can vary based on the throughput rate of a modem installed within the device.

In a column 76 of table 70, a response time is listed which indicates an expected response time for the device to respond when contacted through the particular communication path. Alternately, the listed response time indicates a maximum allowed response time for the device to respond when contacted through the particular communication path. When the device fails to respond, this indicates to portable computer 18 that MIS console 11 is not available to be contacted through the chosen communication path. Portable computer 18 can then choose to attempt connection to MIS console 11 through an alternate communication path, try the same communication path at another time, or abandon the attempt to contact MIS console 11.

Using alternate communication paths to manage portable computers and other devices offer some significant advantages. For example, code updates can be down loaded to devices even when they are not physically attached to any network. Additionally, management access to a computing device is a significant security feature. For example, sensitive data can be erased from a lost or stolen computing device. Similarly, a lost or stolen computing device can be instructed not to boot up. Also, the alternate communication path could be used as an alarm to indicate to a manager that the computing device has been disconnected from a network without authorization.

Also, the alternate communication path can be utilized as a low speed network for data communication, even allowing e-mail or low-throughput connection to the internet.

Remote Code Update/Installation

Figure 7A:
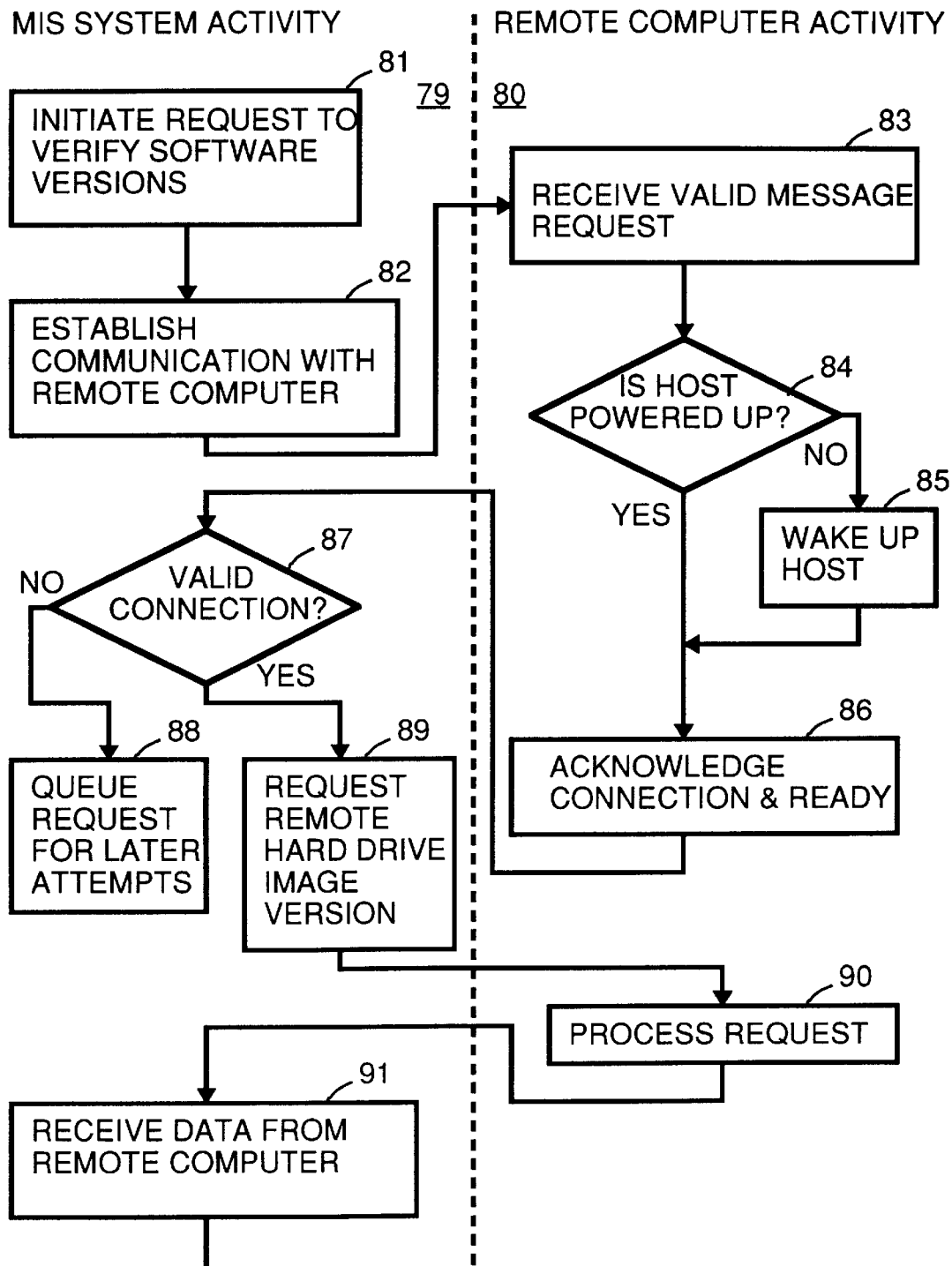
FIGS. 7A and 7B are a flowchart which illustrates remote code update of a remote computer in accordance with a preferred embodiment of the present invention.
Figure 7B:
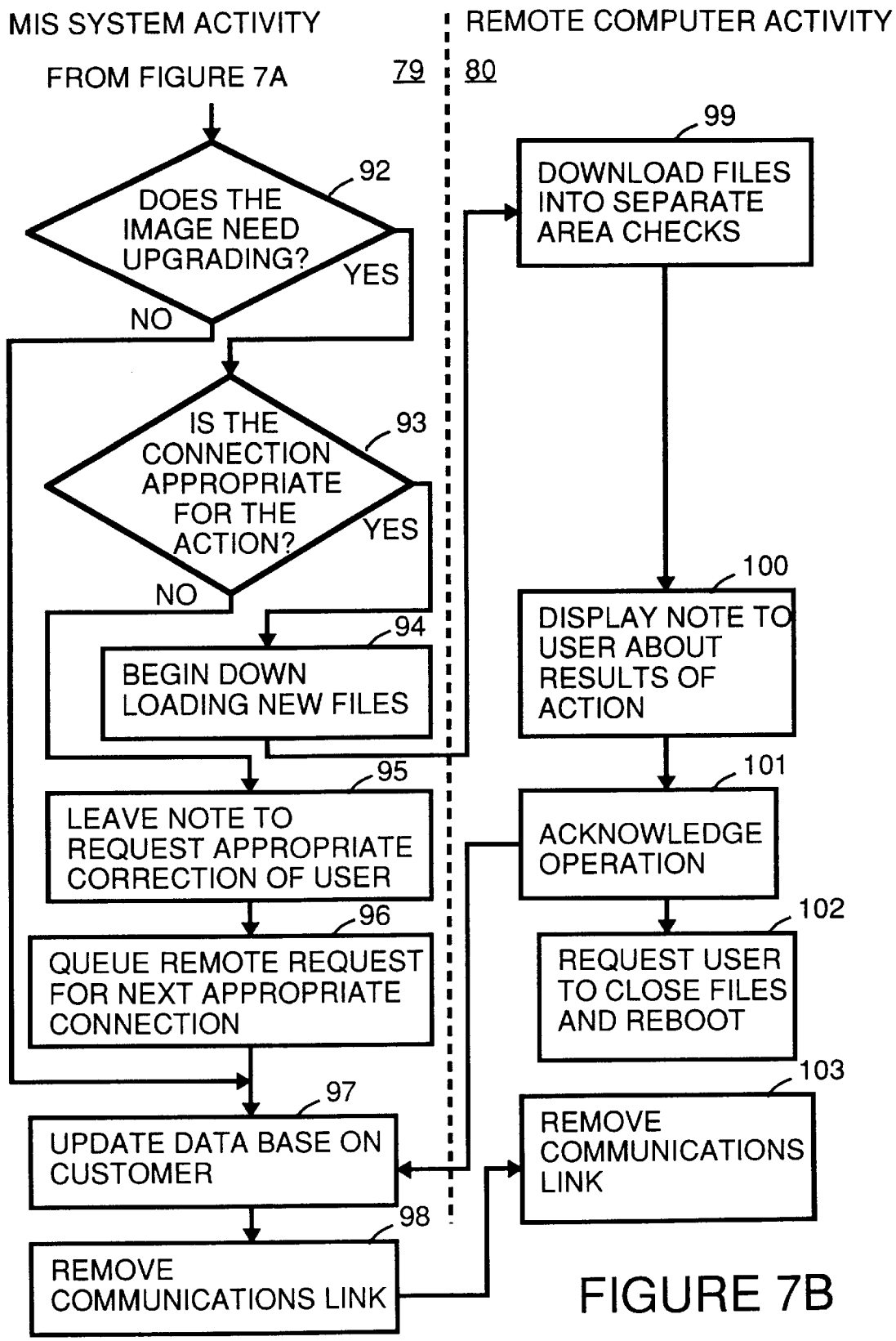

FIGS. 7A and 7B are a flowchart which illustrates remote code update of a remote computer in accordance with a preferred embodiment of the present invention. The same process may be used for installation of software on a remote computer. A left half 79 of the flow chart shows the activity of an MIS system. A right half 80 of the flow chart shows the activity of a remote computer.

In a step 81, the MIS system initiates a request to verify software versions on the remote computer. In a step 82, the MIS system establishes communication with the remote computer. In a step 83, the remote computer receives a valid message request. In a step 84, an internal check of the remote computer is made to determine whether the host processor within the remote computer is powered up. In a step 85, if the remote computer is asleep, it is awakened. In a step 86, the remote computer acknowledges to the MIS system that the remote computer is connected and ready for further transmissions.

In a step 87, the MIS system determines whether there is a valid connection. If there is not a valid connection, in a step 88, the MIS system queues the request for a later attempt. If in step 87, the MIS system determines there is a valid connection, in a step 89, the MIS system requests from the remote computer the version number of the image of the software on the hard drive of the remote computer. In a step 90, the remote computer processes the requests and forwards the requested data to the MIS system. In a step 91 the data is received from the remote computer by the MIS system.

In a step 92, the MIS system determines whether the image needs upgrading. If upgrading is needed, in a step 93, the MIS system determines whether the connection is appropriate for the action. If the connection is appropriate for the action, in a step 94, the MIS system begins to down load the new files to the remote computer. In a step 99 the remote computer downloads the files into separate area checks. In a step 100, the remote computer displays a note to the user about the results of the action. In a step 101, the remote computer acknowledges the operation to the MIS system. In a step 102, the remote computer requests the user to close files and reboot the remote computer.

If in step 93, the MIS system determines that the connection is not appropriate for the action, in a step 95, the MIS system leaves a note to request appropriate correction of user through. an appropriate connection. In a step 96, the MIS system queues a remote request for the next appropriate connection.

When the MIS system is ready to close the connection, in a step 97, the MIS system updates its data base information on the customer. In a step 98, the MIS system removes the communication link with the remote computer. In a step 103, the remote computer removes its communications link with the MIS system.

Establishing Connection with a Remote Computer

Figure 8A:
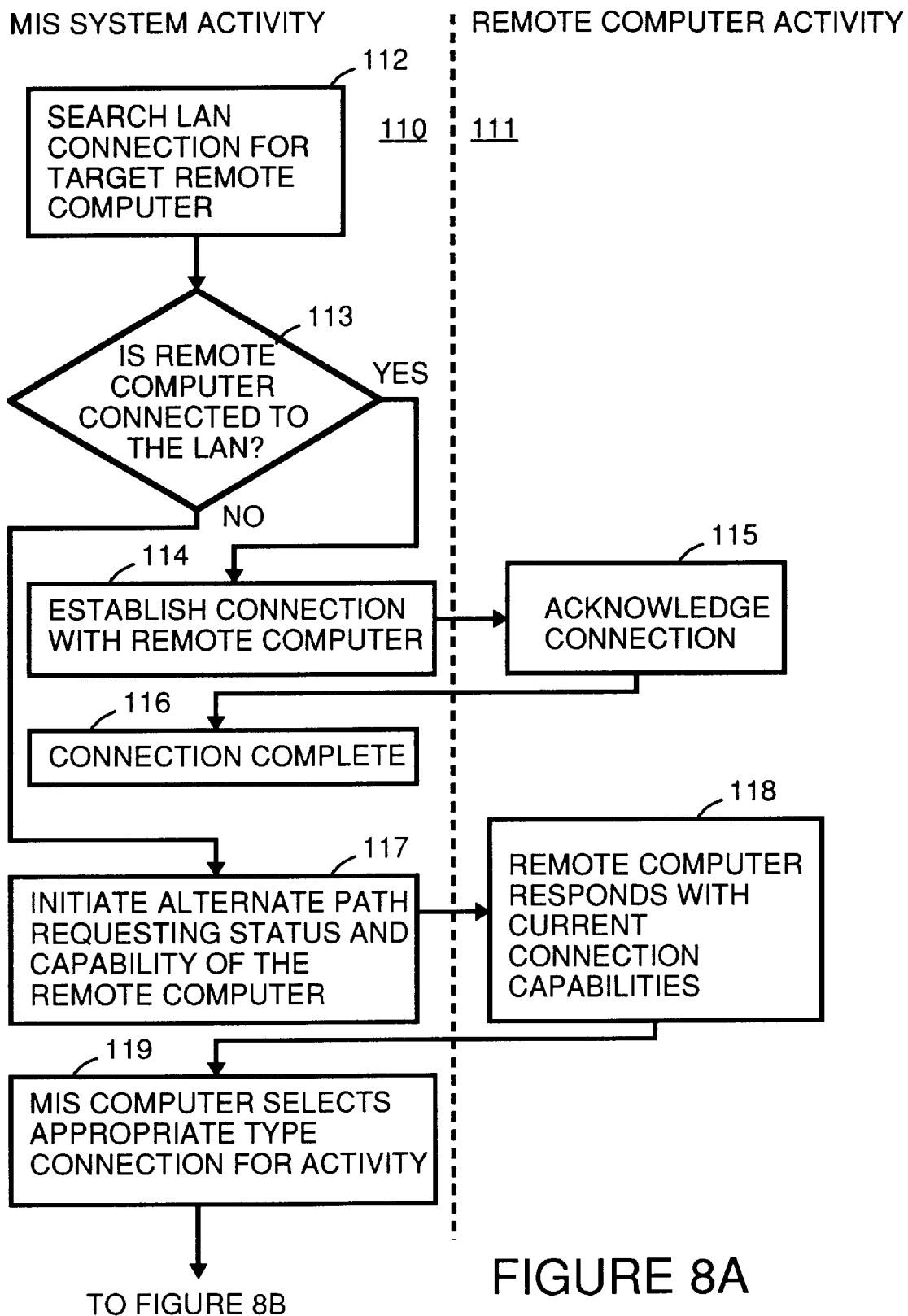
FIGS. 8A and 8B are a flowchart which illustrates the establishment of communication with a remote computer in accordance with a preferred embodiment of the present invention.
Figure 8B:
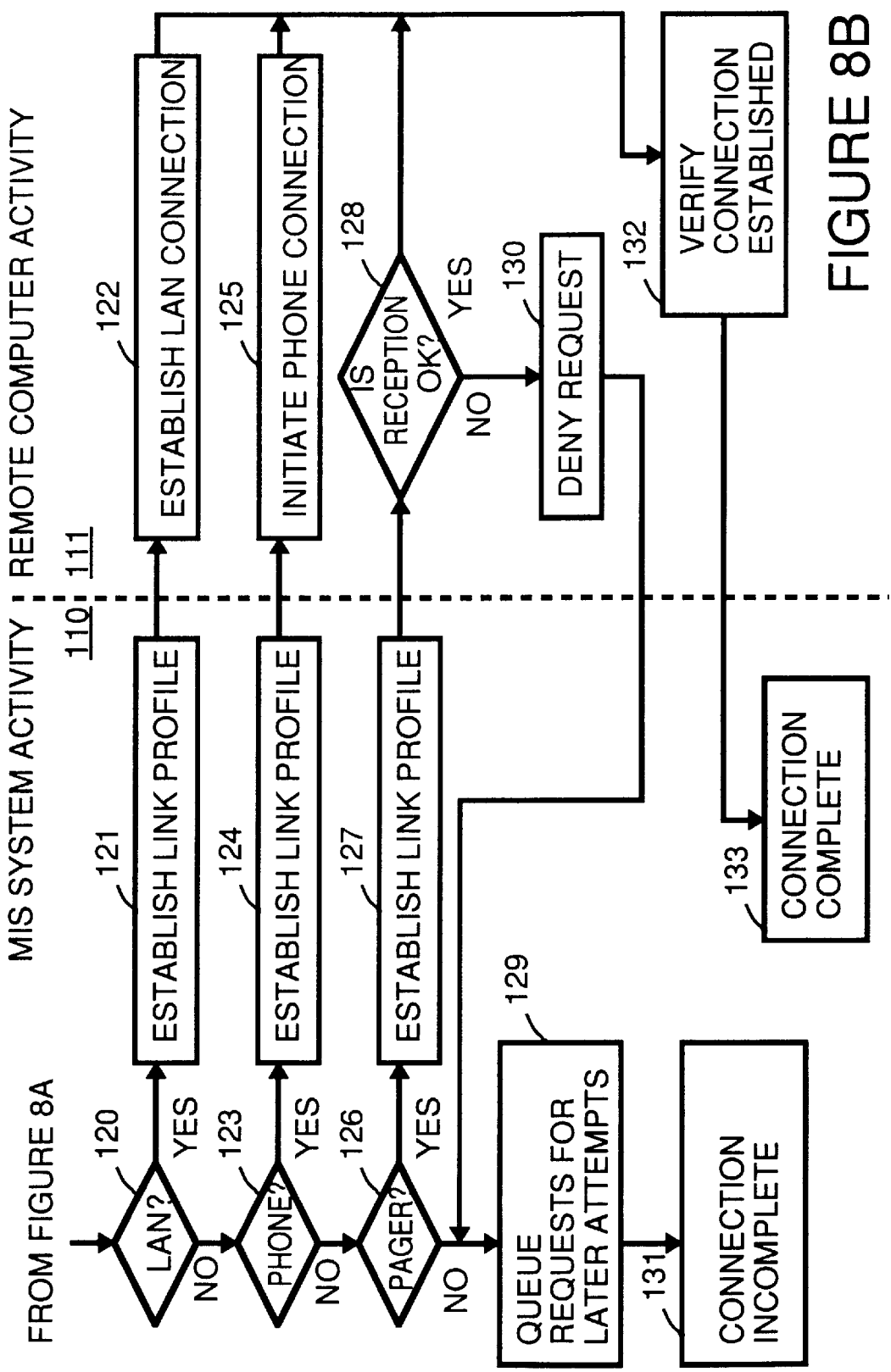

FIGS. 8A and 8B are a flowchart which illustrate the establishment of communication with a remote computer in accordance with a preferred embodiment of the present invention. A left half 110 of the flow chart shows the activity of an MIS system. A right half 111 of the flow chart shows the activity of a remote computer.

In a step 112, the MIS system searches the LAN to which the MIS system is connected in order to determine whether the target remote computer is connected to that LAN. In a step 113, the MIS system determines whether the remote computer is connected to the LAN. If the remote computer is connected to the LAN, in a step 114, the MIS system establishes connection with the remote computer. In a step 115, the remote computer acknowledges the connection. In a step 116, the connection is completed.

If in step 113, the MIS system determines the remote computer is not connected to the LAN, in a step 117, the MIS system initiates an alternative path to the remote computer which requests the status of the remote computer and the various connection paths or types which could be used by the MIS system to connect to the remote computer. For example, the alternative path could be a page or a telephone connection. In a step 118, the remote computer responds with its current connection capabilities.

In a step 119 the MIS system selects the appropriate type connection for the particular activity required. In a step 120, the MIS system determines whether the appropriate connection type is an LAN. If so, in a step 121, the MIS system establishes a link profile. The link profile indicates, for example, whether the link is fast, has a small delay, or is inexpensive. In a step 122, the remote computer establishes an LAN connection with the MIS system. In a step 123, the MIS system determines whether the appropriate connection type is a telephone system. If so, in a step 124, the MIS system establishes a link profile. The link profile indicates, for example, whether the link is fast, has a small delay, or is inexpensive. In a step 125, the remote computer establishes a telephone connection with the MIS system.

In a step 126, the MIS system determines whether the appropriate connection type is a pager. If so, in a step 127, the MIS system establishes a link profile. The link profile indicates, for example, whether the link is fast, has a small delay, or is inexpensive. In a step 128, the remote computer determines whether reception is acceptable to establish the link. If reception is unacceptable, in a step 130, the remote computer denies the request for a link.

When a link has been established in step 122, 125 or 128, in a step 132, the remote computer verifies to the MIS system that the connection is established. In a step 133, the connection is complete. As will be understood by persons of ordinary skill in the art, in addition to the connection types shown, other connection technologies may also be used to establish a link.

When there is no appropriate type of link available for connection, in a step 129, the MIS system queues requests for the remote computer for a later attempt. In a step 131, the MIS system notes that the connection is incomplete.

Computer Security

Figure 9A:
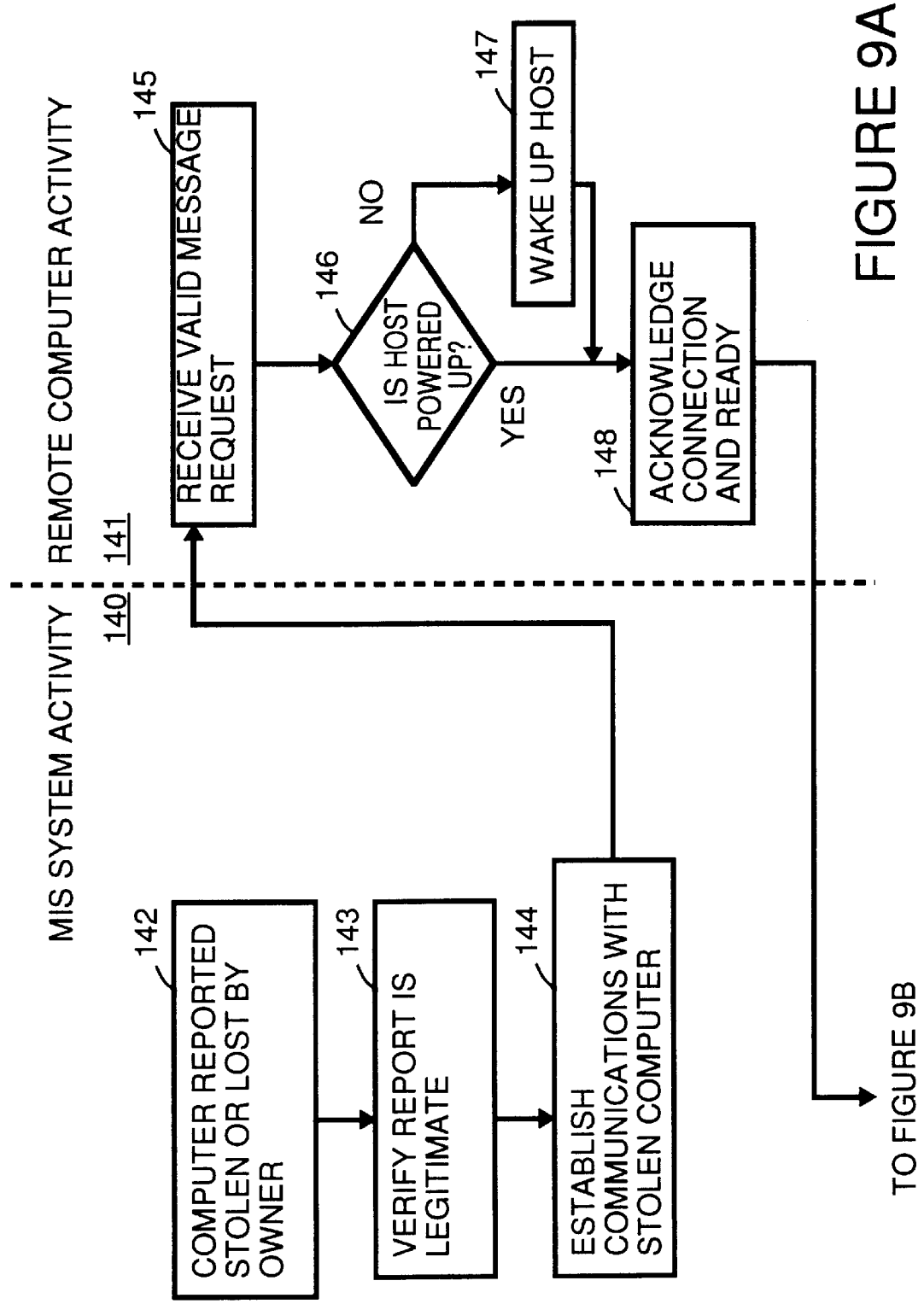
FIGS. 9A and 9B are a flowchart which illustrates actions taken when a remote computer is reported lost or stolen in accordance with a preferred embodiment of the present invention.
Figure 9B:
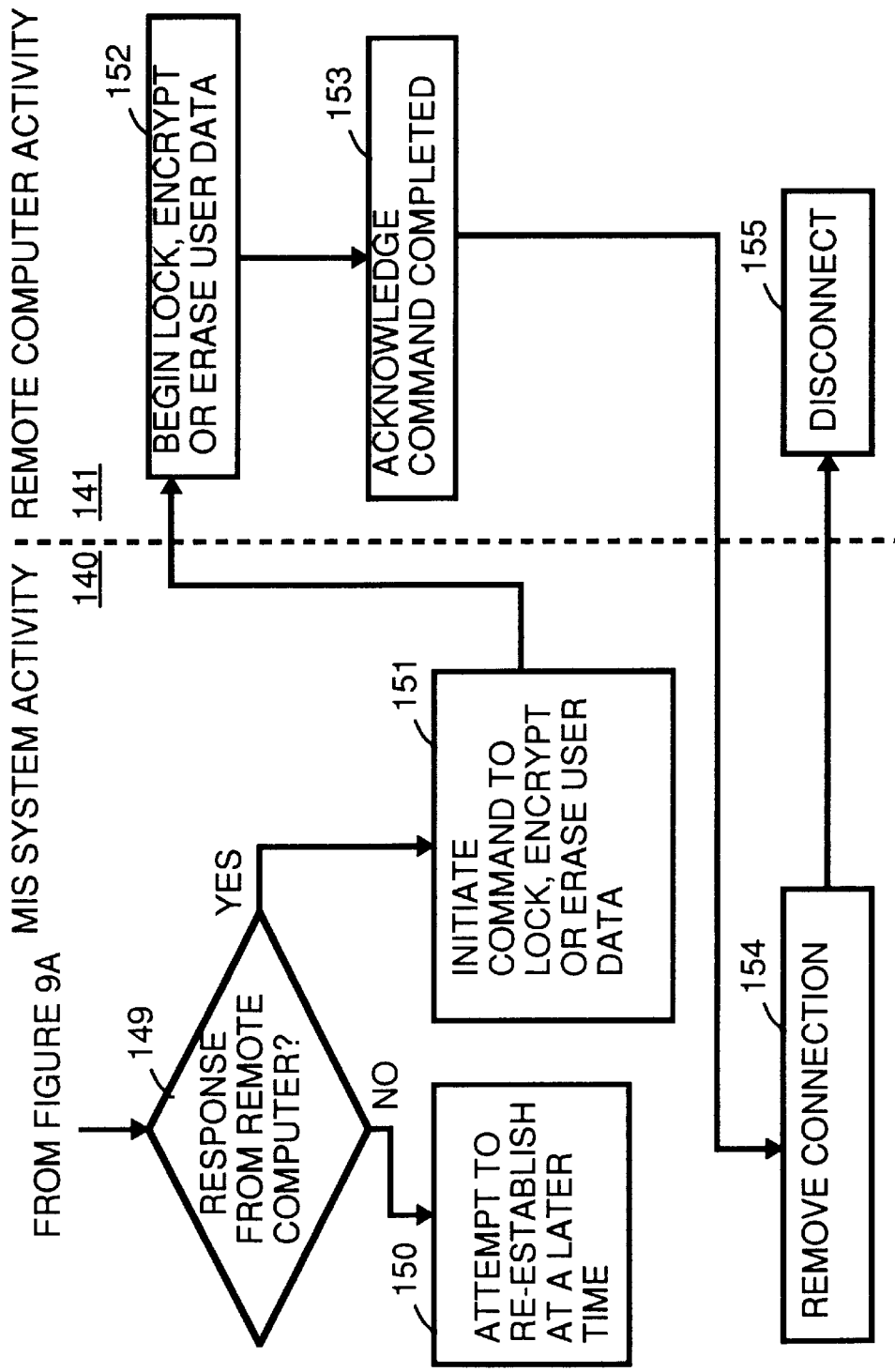

FIGS. 9A and 9B are a flowchart which illustrate actions taken when a remote computer is reported lost or stolen in accordance with a preferred embodiment of the present invention. A left half 140 of the flow chart shows the activity of an MIS system. A right half 141 of the flow chart shows the activity of a remote computer.

In a step 142, the computer is reported stolen or lost by the owner. In a step 143, a verification of the report is made to determine the legitimacy of the report. Steps 142 and 143 is performed, for example, by an operator or manager of the MIS system. In a step 144, the MIS system establishes communication with the remote (stolen or lost) computer. In a step 145, the remote computer receives a valid message request. In a step 146, an internal check of the remote computer is made to determine whether the host processor within the remote computer is powered up? In a step 147, if the remote computer is asleep, it is awakened. In a step 148, the remote computer acknowledges to the MIS system that the remote computer is connected and ready for further transmissions.

In a step 149, the MIS system determines whether there is a valid connection. If there is not a valid connection, in a step 150, the MIS system queues the request for a later attempt. If in step 149, the MIS system determines there is a valid connection, in a step 151, the MIS system initiates a command to lock the computer and/or to encrypt or erase the data of the user. In a step 152 the remote computer responds by locking the computer and/or encrypting or erasing the data of the user. In a step 153, the remote computer acknowledges the command has been completed. In a step 154, the MIS system removes the connection. In a step 155, the remote computer disconnects the link.

Software Metering

FIGS. 10 through 15 illustrate flow for various types of software metering which can be done using remote management. Software metering provides for limits, of one sort or another, on the use of software. As illustrated below, various types of metering can be used. The flexibility allows for various applications such as, for example, timed examinations, games with various levels and trial periods.

Figure 10:
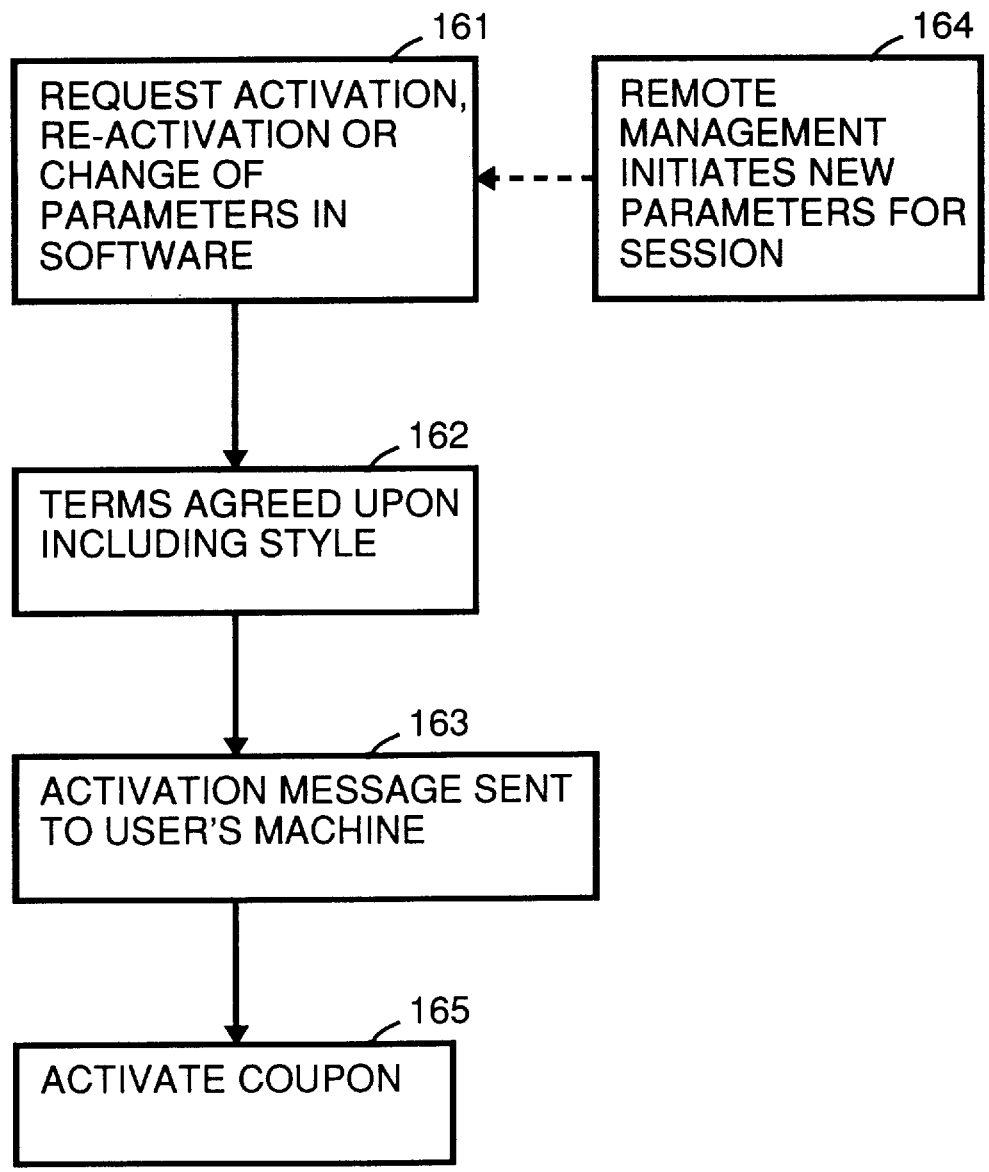
FIG. 10 is a flowchart which illustrates the use of remote management to initialize software metering in accordance with a preferred embodiment of the present invention.

FIG. 10 is a flowchart which illustrates the use of remote management to initialize software metering in accordance with a preferred embodiment of the present invention. In a step 161, a request activation, re-activation or change of parameters in software is made. This can be initiated by a user using the computer system. Alternatively, as illustrated by a step 164, a remote management entity (e.g., a manager of information systems or an instructor) can initiate a new parameter session. The remote management entity initiates change, for example, when it is necessary to update computer systems where a site license has superseded terms for individual licenses.

Once a the request for activation, re-activation or change of parameters in software is made, in a step 162, the terms of the activation, re-activation or change of parameters is agreed upon by the computer system and the remote management. The terms include, for example, method of payment and the style of software metering which is to be used. Once an agreement on terms is reached, in a step 163, a user of the computer system is notified, for example, by an activation message or an activation page being sent to the computing system and appropriately displayed or made available to the user. In a step 163 a coupon is activated in accordance with the terms agreed upon in step 162.

Figure 11:
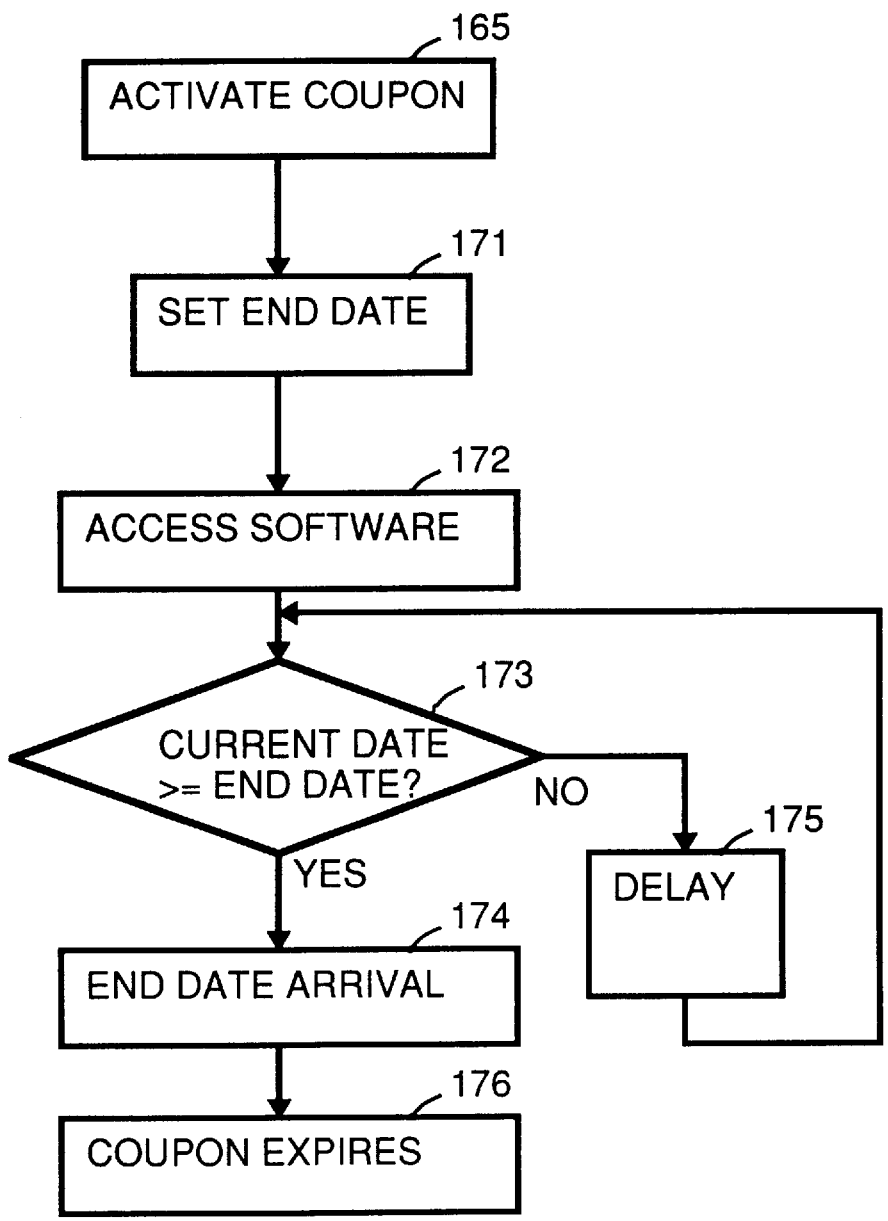
FIG. 11 is a flowchart which illustrates one type of software metering (periodic time style) initialized using remote management in accordance with a preferred embodiment of the present invention.

Various styles of software metering may be used, as illustrated by the flowcharts in FIGS. 10, 11, 12 and 13. FIG. 11 is a flowchart which illustrates a style of software metering which allows usage of software for a set period of time. This style of software metering is useful, for example, to allow a user a trial period for software. In this style of software metering, after the coupon is activated in step 165, in a step 171, an end date is set after which a user will not be allowed to access the software. In a step 172, when a user attempts to access the software, in a step 173, a check is made to see whether the current date is the end date or after the end date. If the current date is not the end date or after the end date, access to the software is allowed to continue. After a set time of delay, as illustrated in a step 175, the current date is checked again in step 173, to check whether the current date is the end date or after the end date.

Figure 15:
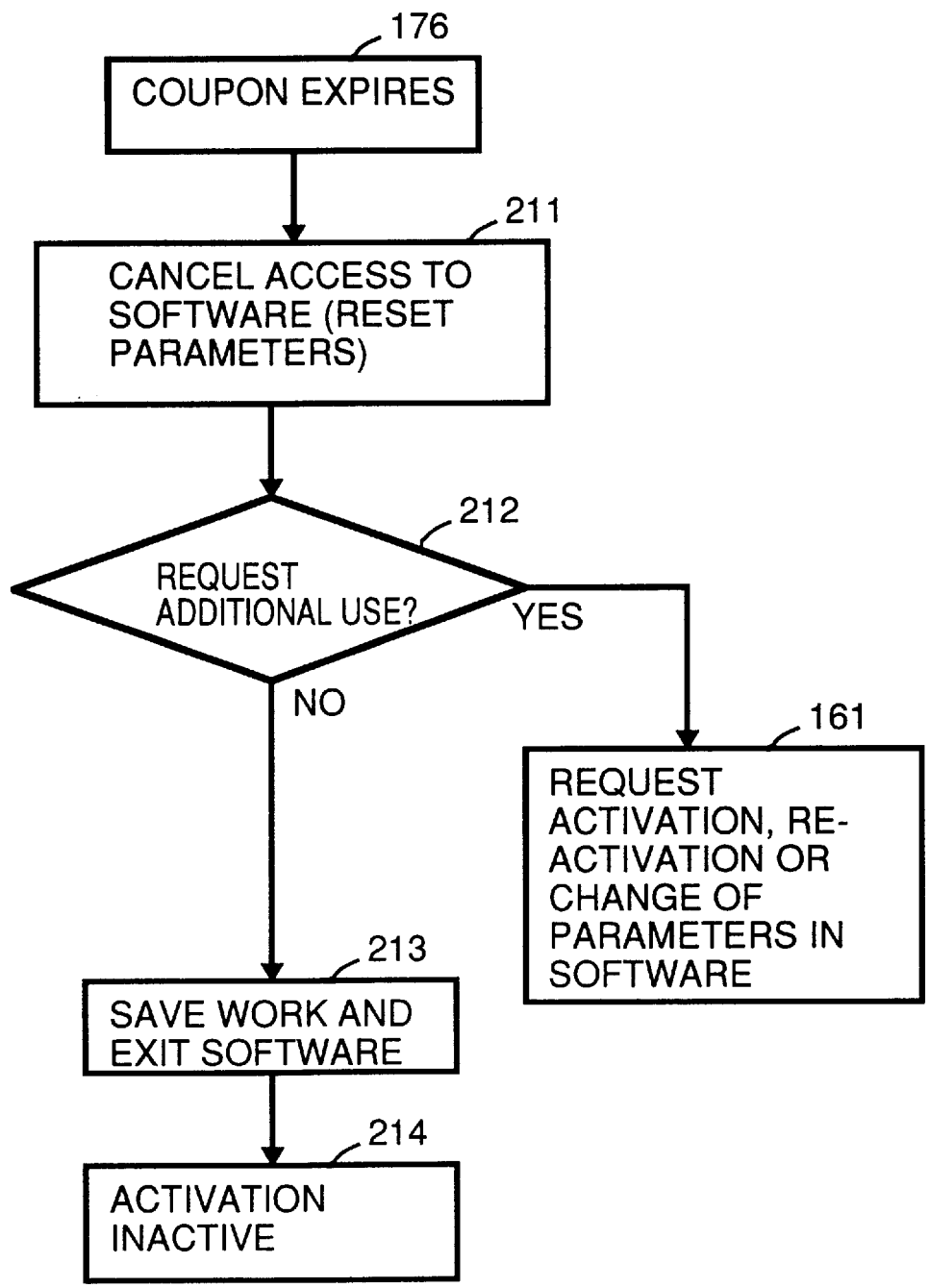
FIG. 15 is a flowchart which illustrates control of software metering when a coupon is expired in accordance with a preferred embodiment of the present invention.

When in step 173, it is determined that the current date is the end date or after the end date, in a step 174, it is recognized that the end date has arrived. In a step 176, the coupon allowing usage of the software is expired. This is handled as is illustrated by FIG. 15 below.

Figure 12:
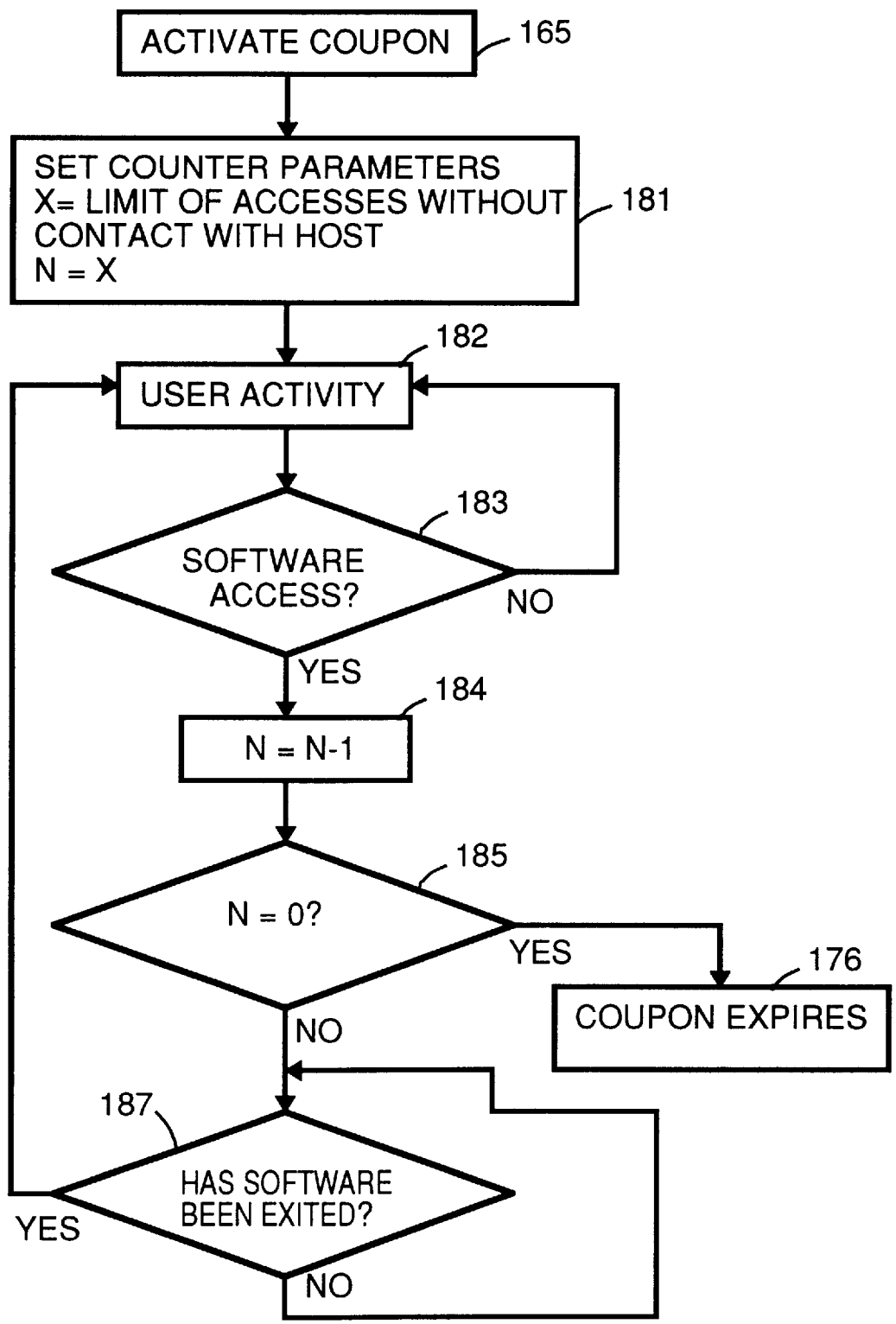
FIG. 12 is a flowchart which illustrates another type of software metering (counter style) initialized using remote management in accordance with a preferred embodiment of the present invention.

FIG. 12 is a flowchart which illustrates a style of software metering which allows usage of software for a set number of times. This style of software metering is useful, for example, to allow a user to test software on a trial basis. In this style of software metering, after the coupon is activated in step 165, in a step 181, a counter parameter is set. After the count has been met, a user will not be allowed to access the software. In a step 182, when a user uses the computer, if it is detected in a step 183, that the user has accessed the software, the counter is decremented (or incremented depending upon the implementation). In a step 185, a check is made to see whether the counter parameter has reached the final count (in the example shown in FIG. 12, the final count is 0). If the counter parameter has not reached the final count, the user is allowed to utilized the software. In a step 187, user activity is monitored to determine when the software has been exited. The software is exited, the flow returns to step 182.

If in step 185, the check indicates the counter parameter has reached the final count, in a step 176, the coupon allowing usage of the software is expired. This is handled as is illustrated by FIG. 15 below.

Figure 13:
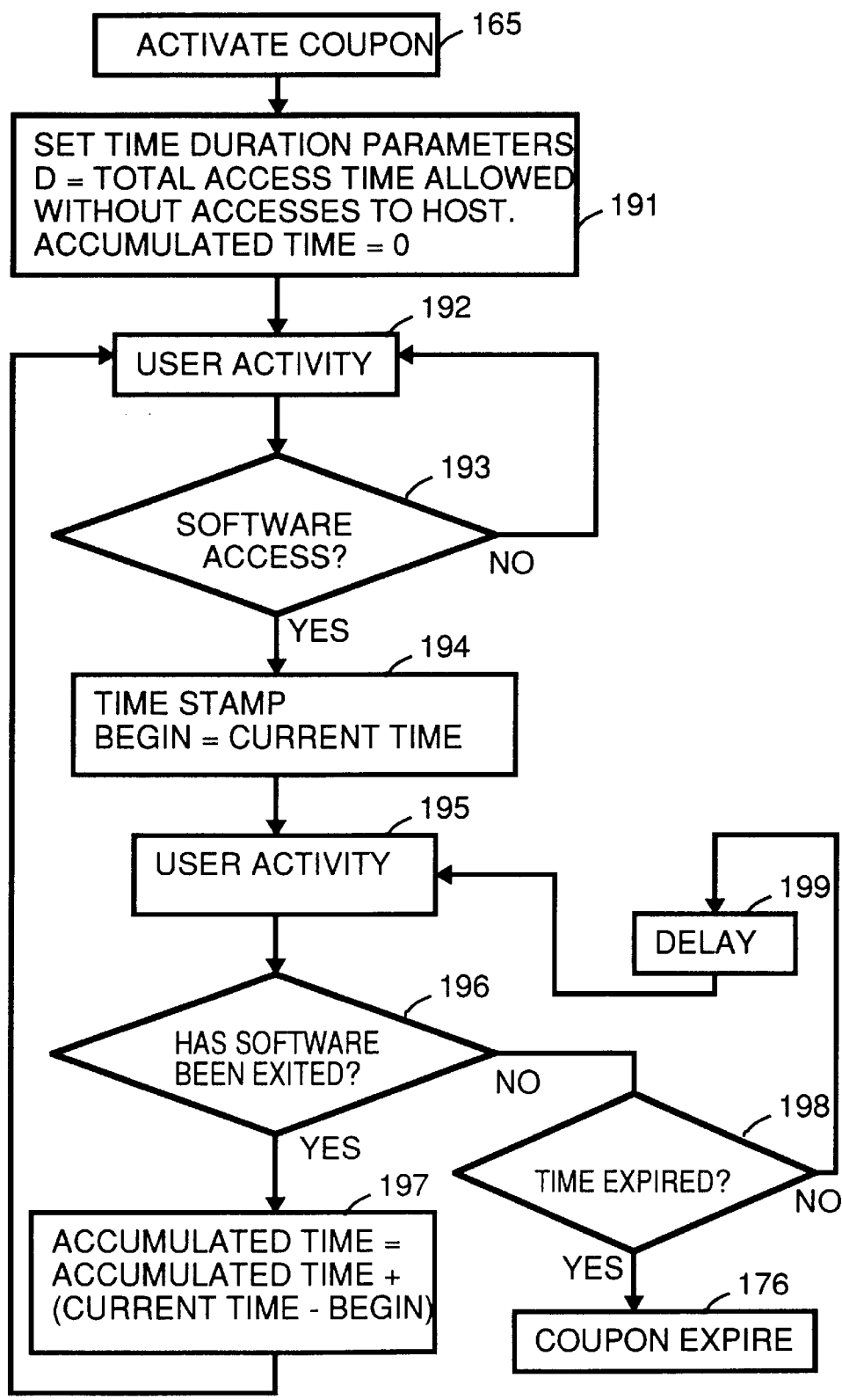
FIG. 13 is a flowchart which illustrates another type of software metering (timed use style) initialized using remote management in accordance with a preferred embodiment of the present invention.

FIG. 13 is a flowchart which illustrates a style of software metering which allows usage of software for a set duration of time. This style of software metering is useful, for example, for examinations, trials of software or for game applications. In this style of software metering, after the coupon is activated in step 165, in a step 191, a duration parameter is set which indicates the total access time allowed without further accesses to a host management system. The current accumulated time is also initialized to zero. After the duration of time has been met, a user will not be allowed to access the software. In a step 192, when a user uses the computer, if it is detected in a step 193, that the user has accessed the software, a time stamp is used to record the starting (current) time use of the software begins.

In a step 195, when a user uses the computer, if it is detected in a step 196, that the user has exited the software, in a step 197, the accumulated time is increased by the amount of time the software was used. As illustrated by FIG. 13, the amount the accumulated time is increased is the different between the current time and the begin time stored in step 194. After calculation of accumulated time in step 197, step 192 is repeated.

If in step 196, it is determined that the user has not exited the software, in a step 198 a check is made as to whether the duration of time has expired (i.e., accumulated time+ (current time—begin time)>=Total access time (D)). If the duration time has not expired, in a step 199, a delay is taken, depending on required accuracy, before checking for user activity in a step 195.

If, in step 198, the check indicates the duration of time has expired, in a step 176, the coupon allowing usage of the software is expired. This is handled as is illustrated by FIG. 15 below.

Figure 14:
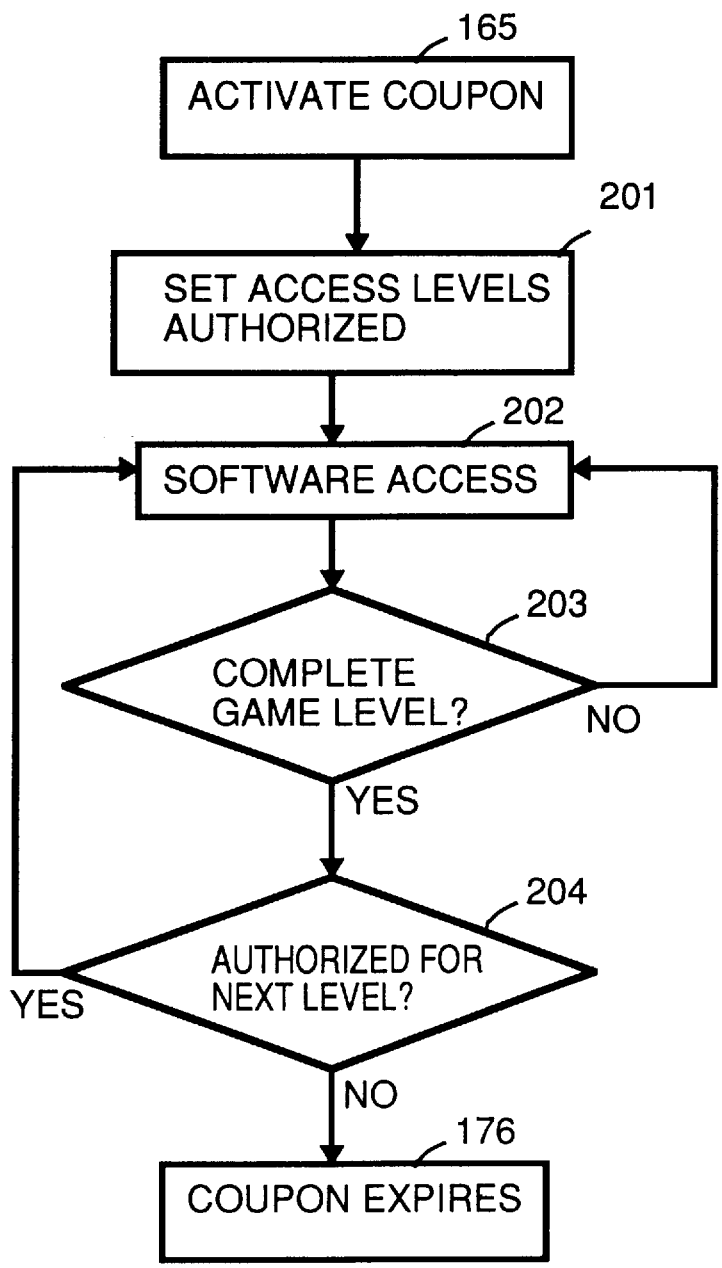
FIG. 14 is a flowchart which illustrates another type of software metering (interactive style) initialized using remote management in accordance with a preferred embodiment of the present invention.

FIG. 14 is a flowchart which illustrates a style of software metering which allows usage of software for a interaction level. This style of software metering is useful, for example, for game applications. In this style of software metering, after the coupon is activated in step 165, in a step 201, certain access levels are authorized. These indicate which access levels may be utilized by a user. In a step 202, when a user uses the computer, if it is detected in a step 203 that the user has not completed an access level, the user is allowed continued access to the software.

If it is detected in a step 203 that the user has completed an access level, in a step 204, a check is made to determine whether the user is authorized to use the next level. If it is determined in step 204 that the user is authorized to use the next level, the user is allowed continued access to the software and returns to step 202.

If it is determined in step 204 that the user is not authorized to use the next level, in step 176, the coupon allowing usage of the software is expired. This is handled as is illustrated by FIG. 15 below.

FIG. 15 is a flowchart which illustrates what happens when in step 176, the coupon allowing usage of the software is expired. In a step 211, access to the software is canceled and the parameters are reset. In a step 212, the user is queried as to whether additional use is requested. If in step 212, the user indicates no additional use is desired, in a step 213, the work is saved for later access by the user or by the remote management system and the software is exited. In a step 214, the activation status is placed as inactive, which will prevent further access to the software.

If in step 212, the user indicates additional use is desired, control is returned to step 161, shown in FIG. 10. In step 161, a request activation, re-activation or change of parameters in software is made.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for remote installation of an update of software by a management information system into a remote computer comprising the following steps:

(a) when a primary communication path between the management information system and the remote computer is unavailable and an alternate communication path is available, establishing connection between the management information system and the remote computer using the alternate communication path;

(b) requesting, by the management information system from the remote computer information, current version information of the software within the remote computer; and, (c) when the management information system determines a current version of the software within the remote computer needs to be updated, performing the following substeps:

(c.1) determining by the management information system whether the alternate communication path is adequate for downloading the update of the software, (c.2) when the management information system determines in step (c.1) that the alternate communication path is adequate for downloading the update of the software, downloading the update of the software from the management information system to the remote computer, (c.3) when the management information system determines in step (c.1) that the alternate communication path is not adequate for downloading the update of the software, refraining from downloading the update of the software from the management information system to the remote computer, and (c.4) when the management information system determines in step (c.1) that the alternate communication path is not adequate for downloading the update of the software, queuing the download of the update of the software from the management information system to the remote computer for performance when the computer is connected to the primary communication path.

2. A method as in claim 1 wherein in step (a) the primary communication path is through a local area network.

3. A method as in claim 1 wherein in step (a) the alternate communication path is through a two-way paging network system.

4. A method as in claim 1 wherein in step (a) the alternate communication path is through a public telephone system.

5. A method as in claim 1 wherein in step (a) the primary communication path is through a public telephone system.

6. A method as in claim 1 wherein in step (a) the primary communication path is through an internet system.

7. A method for remote installation of an update of software by a management information system into a remote computer comprising the following steps:

(a) establishing a connection link between the management information system and the remote computer;

(b) obtaining, by the management information system from the remote computer, current version information about the software;

(c) when the management information system determines the software on the remote computer requires updating, performing the following substeps:
  (c.1) determining by the management information system whether the connection link is adequate for downloading an update of the software,
  (c.2) when the management information system determines in step (c.1) that the connection link is adequate for downloading the update of the software, downloading the update of the software from the management information system to the remote computer,
  (c.3) when the management information system determines in step (c.1) that the connection link is not adequate for downloading the update of the software, refraining from downloading the update of the software from the management information system to the remote computer, and
  (c.4) when the management information svstem determines in step (c.1) that the connection link is not adequate for downloading the update of the software, queuing the download of the update of the software from the management information system to the remote computer for performance when the computer is connected to a second connection link which is adequate for downloading the update of the software.

8. A method as in claim 7 wherein in substep (c.4) the second connection link is through a local area network.

9. A method as in claim 7 wherein in substep (c.4) the second connection link is through a public telephone system.

10. A method as in claim 7 wherein in step (a) the connection link is through a two-way paging network system.

11. A method as in claim 7 wherein in step (a) the connection link is through a public telephone system.

12. A method as in claim 7 wherein in step (a) the connection link is through an internet system.

13. A method as in claim 7 wherein step (a) includes
  when the remote computer is not currently powered up, awakening the remote computer.

14. Storage media which stores a software application which performs a method for remote installation of an update of software by a management information system into a remote computer, the method comprising the following steps:
  (a) establishing a connection link between the management information system and the remote computer;
  (b) obtaining, by the management information system from the remote computer, current version information about the software;
  (c) when the management information system determines the software on the remote computer requires updating, performing the following substeps:
    (c.1) determining by the management information system whether the connection link is adequate for downloading an update of the software,
    (c.2) when the management information system determines in step (c.1) that the connection link is adequate for downloading the update of the software, downloading the update of the software from the management information system to the remote computer,
    (c.3) when the management information system determines in step (c.1) that the connection link is not adequate for downloading the update of the software, refraining from downloading the update of the software from the management information system to the remote computer, and
    (c.4) when the management information system determines in step (c.1) that the connection link is not adequate for downloading the update of the software, queuing the download of the update of the software from the management information svstem to the remote computer for performance when the computer is connected to a second connection link which is adequate for downloading the update of the software.

15. Storage media as in claim 14 wherein in substep (c.4) the second connection link is through a local area network.

16. Storage media as in claim 14 wherein in substep (c.4) the second connection link is through a public telephone system.

17. Storage media as in claim 14 wherein in substep (c.4) the second connection link is through an internet system.

18. Storage media as in claim 14 wherein in step (a) the connection link is through a two-way paging network system.

19. Storage media as in claim 14 wherein in step (a) the connection link is through a public telephone system.

20. Storage media as in claim 14 wherein step (a) includes
  when the remote computer is not currently powered up, awakening the remote computer.

21. Storage media as in claim 14 wherein step (a) includes
  when the remote computer is not currently powered up, awakening the remote computer.

22. A method for remote installation of software by a management information system into a remote computer comprising the following steps:
  (a) when a primary communication path between the management information system and the remote computer is unavailable and an alternate communication path is available, establishing connection between the management information system and the remote computer using the alternate communication path;
  (b) when the management information system determines to download software, performing the following substeps:
    (b.1) determining by the management information system whether the alternate communication path is adequate for downloading the software,
    (b.2) when the management information system determines in step (c.1) that the alternate communication path is adequate for downloading the software, downloading the software from the management information system to the remote computer,
    (b.3) when the management information system determines in step (b.1) that the alternate communication path is not adequate for downloading the software, refraining from downloading the software from the management information system to the remote computer, and
    (b.4) when the management information system determines in step (b.1) that the alternate communication path is not adequate for downloading the software, queuing the download of the software from the management information system to the remote computer for performance when the computer is connected to the primary communication path.

* * * * *

UNITED STATES PATENT AND TRADEMARK OFFICE
CERTIFICATE OF CORRECTION

PATENT NO.   : 5,809,251
DATED        : September 15, 1998
INVENTOR(S)  : Gregory J. May et al.

It is certified that error appears in the above-identified patent and that said Letters Patent is hereby corrected as shown below:

Column 13,
Line 19, delete "svstem" and insert therefor -- system --

Column 14,
Line 8, delete "svstem" and insert therefor -- system --

Signed and Sealed this

Fourteenth Day of September, 2004

JON W. DUDAS
*Director of the United States Patent and Trademark Office*